(12) United States Patent
Wagstaff et al.

(10) Patent No.: US 6,360,213 B1
(45) Date of Patent: Mar. 19, 2002

(54) SYSTEM AND METHOD FOR CONTINUOUSLY ADAPTIVE INDEXES

(75) Inventors: William M. Wagstaff, Saratoga; Donovan A. Schneider; Galt Johnson, both of San Francisco; Jeffrey A. Byard, San Jose; David L. Morandi; Phillip M. Fernandez, both of Palo Alto, all of CA (US); Arunachalam Balachandran, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/170,991

(22) Filed: Oct. 13, 1998

Related U.S. Application Data
(60) Provisional application No. 60/061,960, filed on Oct. 14, 1997.

(51) Int. Cl.[7] ................................................. G06F 17/00
(52) U.S. Cl. ..................... 707/1; 707/3; 707/4; 707/10
(58) Field of Search ....................... 707/1–10, 100–104, 707/200–206, 225–238; 379/88.17; 709/225–238; 705/35–36; 708/270–272, 446–517

(56) References Cited

U.S. PATENT DOCUMENTS

| | | | | |
|---|---|---|---|---|
| 5,184,317 A | * | 2/1993 | Pickett | 708/446 |
| 5,359,551 A | * | 10/1994 | Pickett | 708/270 |
| 5,761,442 A | * | 6/1998 | Barr | 705/36 |
| 5,878,423 A | * | 3/1999 | Anderson et al. | 707/100 |
| 6,151,629 A | * | 11/2000 | Trewitt | 709/227 |

OTHER PUBLICATIONS

Ohta et al., "A very small sized reversed phase hybrid ring", Microwave Symposium Digest, 2000 IEEE MTT–S International, vol. 2, pp. 1145–1148.*

Ahn et al., "Arbitrary termination impedances, arbitrary power division, and small sized ring hybrids", Microwave Theory and Techniques, IEEE Transaction on, vol. 45, Dec. 1997, pp. 2241–2247.*

Wang et al., "Practical adaptive hybrids with no bursting", Acoustics, Speech, and Signal Processing, 1993, ICASSP–93, IEEE, vol. 3, pp. 336–339.*

Faloutsos et al, "Hybrid Index Organizations for Text Databases", Advances in Database Technology—EDBT '92, 3rd International Conference on Extending Database Technology, Mar. 1992, pp. 310–327.*

Brobowski et al., Oracle 7 Server Concepts Manual, 1992, pp. 1–4, 1–5, 5–14 to 5–15, 7–1 to 7–7.*

* cited by examiner

*Primary Examiner*—David Jung
(74) *Attorney, Agent, or Firm*—Fish & Richardson P.C.

(57) ABSTRACT

Hybrid target indexes are employed for skewed data set domains. Such hybrid indexes contain multiple value representations within a given index. The representations can be optimized for particular keys in highly skewed data set domains. For example, a hybrid target index on customer states might employ a bitmap to represent the index value for a California key and also employ, in the same index, an uncompressed list of row-IDs to represent the index value for a Delaware key.

33 Claims, 8 Drawing Sheets

SYSTEM AND METHOD FOR CONTINUOUSLY ADAPTIVE INDEXES

CROSS-REFERENCE TO RELATED APPLICATIONS

This application claims priority under 35 USC 119(e) from U.S. Provisional Application No. 60/061,960, filed Oct. 14, 1997, naming Wagstaff, et al. as inventors, and titled "SYSTEM AND METHOD FOR CONTINUOUSLY ADAPTIVE INDEXES." That application is incorporated herein by reference in its entirety and for all purposes.

BACKGROUND OF THE INVENTION

The present invention relates generally to technology used to access and manipulate data in large data sets. More particularly, the present invention is directed to a system and method for automatic and optimal access of data using auxiliary data structures known as indexes. Such indexes permit data queries of large data sets to run faster and require less memory to process.

Indexes are widely used in database tables. Typically, an index is created for one or more columns in a database table. One type of index is the "target index." An entry in a target index logically consists of a <key:value> pair, where the "key" corresponds to a datum in the data set that is to be indexed and the "value" indicates which record(s) in the data set have this particular key. For example, an index built on an "Age" column might have an entry for the age value 35 in the form: <35:1,4,7>, meaning that records 1, 4, and 7 in the indexed data set have an age value 35.

The above example represents the value as a list of record numbers. However, multiple possible representations for the value list exist. One possible representation is a bit vector or "bitmap," in which a bit exists for each row in the data set and the $n^{th}$ bit being set to one indicates that the $n^{th}$ record in the data set has this key value. Depending on the number of distinct keys and the number of records in the data set, the optimal representation may vary. For example, for a small data set with many distinct keys, the representation of a list of row pointers is quite efficient. However, in a large data set with few distinct keys, the bit vector representation is typically more efficient.

In general, the representation chosen for an index strongly depends upon the selectivity that a given key imparts to a query constraint. That is, it depends on the likelihood that use of the key in a query will very specifically select a given record. The term weakly selective describes a constraint that retrieves many records from a table. Weak selectivity typically occurs when a column in a very large table has a small domain (set of possible values). For example, the domain of a Gender column in an "Employees" table consists of only two possible values for every row—Male or Female. Constraints on that column will be weakly selective; they will usually retrieve a very large list of rows.

Larger domains might also give rise to weak selectivity. For example, an Age column in the same table would have a much larger domain than a Gender column, but constraints on age might still be weakly selective, especially if the data is not uniformly spread across the domain or if the constraints specify values that dominate the domain.

A strongly selective constraint will retrieve only relatively few records from a large number of records. For example, a query constraint on a social security number column of the Employees table will generally be strongly selective.

The term "cardinality" is sometimes used to refer to domain size. A column with high cardinality has many possible keys. For example, the cardinality of a social security number is about one billion. In contrast, the cardinality of gender is two (male and female). Generally, though not necessarily, constraints on columns having high cardinality are strongly selective, and constraints on columns having low cardinality are weakly selective.

Conventional B-tree indexes are well suited for columns of high cardinality, while target indexes are well suited for columns having low or intermediate cardinality. As noted, a target index consists of a <key:value> pair.

Some database management systems allow flexibility in representing a target index; that is, various representations are available for the indexes that the database administrator creates. For example, an index on a "Gender" column of a data set may be represented as a bitmap, while the index on an "Age" column may be represented as a compressed list of record IDs. Still further, a column of "zip code" might be stored as an uncompressed list of record IDs. The choice should be driven, at least in part, by the storage space required for the index. A small storage requirement requires less memory to process and generally allows queries run faster (although a compressed list must allow additional processing time for decompression and recompression).

In the Red Brick™ Warehouse relational database management system available from Red Brick Systems, Inc. of Los Gatos, Calif., a user can choose the representation of a target index by specifying the relative domain size for the column being indexed. For example, if the user specifies that the domain is small (e.g., gender), the system will generate a target index in which the list of records is represented as a bitmap. Alternatively, if the user specifies that the domain size is medium (e.g., the attribute is states), the system will build an index in which the value is provided as a compressed row list. Still further, if the user specifies that the domain size is large (e.g., zip code), the system will build an index in which the value is represented as an uncompressed row list. For very large domains, such as social security number, the system should be instructed to build a B-tree index.

While this approach allows the system to intelligently build an index that will usually be optimal for a given attribute, in some cases "data skew" within a given column can degrade the performance of the index. Data skew results when the number of records per key in the index varies widely. For example, in a table of customers, the number of records associated with the state of California can be expected to be much larger than the number of records associated with the state of Delaware (due to the population difference between these two states). Thus, a query constrained to California customers will return a much larger number of records than a query constrained to Delaware records.

The effect of data skew on optimal index representations is illustrated by the following example. Assume that a company has a customer list containing one million records and that the company does business in California and Delaware, among other states. Nine percent of the company's customers are based in California and 0.1 percent are based in Delaware. Therefore, the customer table for this company will contain 90,000 rows in which the customer's state is California and only 1,000 rows in which the customer's state is Delaware. If the company decides to build an index on the state column in its customer table, it might choose either a bitmap representation or a list representation.

Any bitmap representation will include 1,000,000 bits per key (state). Thus, both the California key and the Delaware key will have an associated bitmap of 1,000,000 bits each. Each of those bits is associated with one of the rows in the customer table. A value of 1 at a particular position in the bitmap indicates that the corresponding row of the table contains a record for the key associated with the bitmap. In the case of California, 90,000 of the bits will be 1s, and in the case of Delaware, only 1,000 of the bits will be 1s.

Alternatively, the index on the state column could be represented as a list. Assuming that each row ID in a list representation requires a storage space of six bytes (48 bits), then 4.3 million bits are required to store a list of the 90,000 row-IDs for California customers. Clearly, it is more efficient to have the California key index entry represented as a bitmap.

For Delaware, only 48,000 bits (48 bits/customer×1000 customers) are required to store its index entry in a list representation. As this is significantly less than the 1,000,000 bits required for the bitmap representation, it would be more efficient to represent the value portion of the Delaware customers index entry as a list.

In view of the problem associated with data skew, an improved representation for target indexes would be desirable.

SUMMARY OF THE INVENTION

The present invention addresses this need by providing hybrid target indexes for data set domains. Such hybrid indexes contain multiple representations within a given index. The representations can be optimized for particular keys in highly skewed data set domains. For example, a hybrid target index on customer states might employ a bitmap to represent the index value for a California key and also employ, in the same index, an uncompressed list of row-IDs to represent the index value for a Delaware key.

Generally, the invention may be characterized as pertaining to a hybrid index on a domain of a data set (e.g., a collection of records in a database such as a relational database table). The hybrid index includes various entries, each of which includes a record list value associated with a key, with the value portion of an entry specifying a record or records in a data set that has the key for the entry. The hybrid index uses two or more representations (e.g., a bitmap representation and uncompressed record list representation) for the value portions of the entries.

The representation of a given key may depend upon the selectivity of that key in the domain. For example, the domain may include a first key and a second key (among others possibly), with the first key being more selective than the second key. In this case, the first key might have a value represented as a record list and the second key might have a value represented as a bitmap. In one embodiment, values are represented in increasing order of key selectivity as follows: (a) bitmaps, (b) compressed record lists, and (c) uncompressed record lists.

The hybrid index may include a record location area to facilitate locating an index entry for a particular key. The record location area may, in turn, include multiple <key:index location> entries, each specifying the location in the hybrid index of an entry for a given key. The entries of the record location area may also specify the representation type (bitmap representation versus compressed list representation, for example) for the values associated with the keys in the hybrid index.

Another aspect of the invention pertains to a method of modifying a hybrid index when a record in its data set is inserted, deleted, or updated. The method may be characterized as including the following sequence: (a) identifying the hybrid index key of the record that is being inserted, deleted, or updated; (b) determining how to represent the value of the hybrid index entry for the key of the record that is being inserted, deleted, or updated; and (c) representing, as determined in (b), the value of the hybrid index entry for the key of the record being inserted, deleted, or updated.

In determining how to represent the value of the hybrid index entry, the system may determine the selectivity of the key of the record being inserted, deleted, or updated. More specifically, this may involve determining whether the selectivity of the key is above or below a predefined threshold. If it is above the threshold, the value may be represented as a bitmap. If it is below the threshold, the value may be represented as a list of row-IDs.

In some cases, the insertion, deletion or update will require changing a previous representation of the value to a new representation. For example, a value that may have originally been represented as a bitmap will, upon an update replacing its key in a record, be more appropriately represented as a list of row-IDs. This can result because a selectivity threshold has been crossed. When this occurs, it may be desirable to note the new representation in a record locator area for the hybrid index.

To prevent the value representation for a given key from frequently oscillating, it may be desirable to provide two distinct thresholds for changing a first representation to second representation. The first threshold would be associated with increasing the selectivity of the key and the second threshold would be associated with decreasing the selectivity of the key. In this case, the first threshold is greater than the second threshold.

Another aspect of the invention involves a method of creating the hybrid index in a computer system including a data set. This method may be characterized by the following sequence: (a) identifying the key of one or more records in the data set; (b) determining how to represent the value of the hybrid index entry for the key of the record or records; and (c) representing, as determined in (b), the value of the hybrid index entry for the key of the record or records. In a specific embodiment, determining how to represent the value at (b) involves determining whether the data set has less than a predefined number of records. When it does, the computer system specifies the representation based upon the fact that the data set is small (as opposed to basing the decision on the selectivity of a key).

These and other features and advantages of the present invention will be further described in the following descriptions of the invention with reference to the associated figures.

BRIEF DESCRIPTION OF THE DRAWINGS

FIG. 3 is a schematic illustration of a portion of a hybrid target index in accordance with one embodiment of this invention.

DETAILED DESCRIPTION OF THE PREFERRED EMBODIMENTS

The following description will focus on the presently preferred embodiment of the present invention, which is operative in a network environment executing client/server database applications. The present invention, however, is not limited to any particular application or environment. Instead, those skilled in the art will find that the present invention may be advantageously applied to any application or environment where target indexes are employed to facilitate access to records in a data set, including non-SQL database management systems and the like. The description of the exemplary embodiments which follows is, therefore, for the purpose of illustration and not limitation.

Standalone System Hardware

Figure 1A:
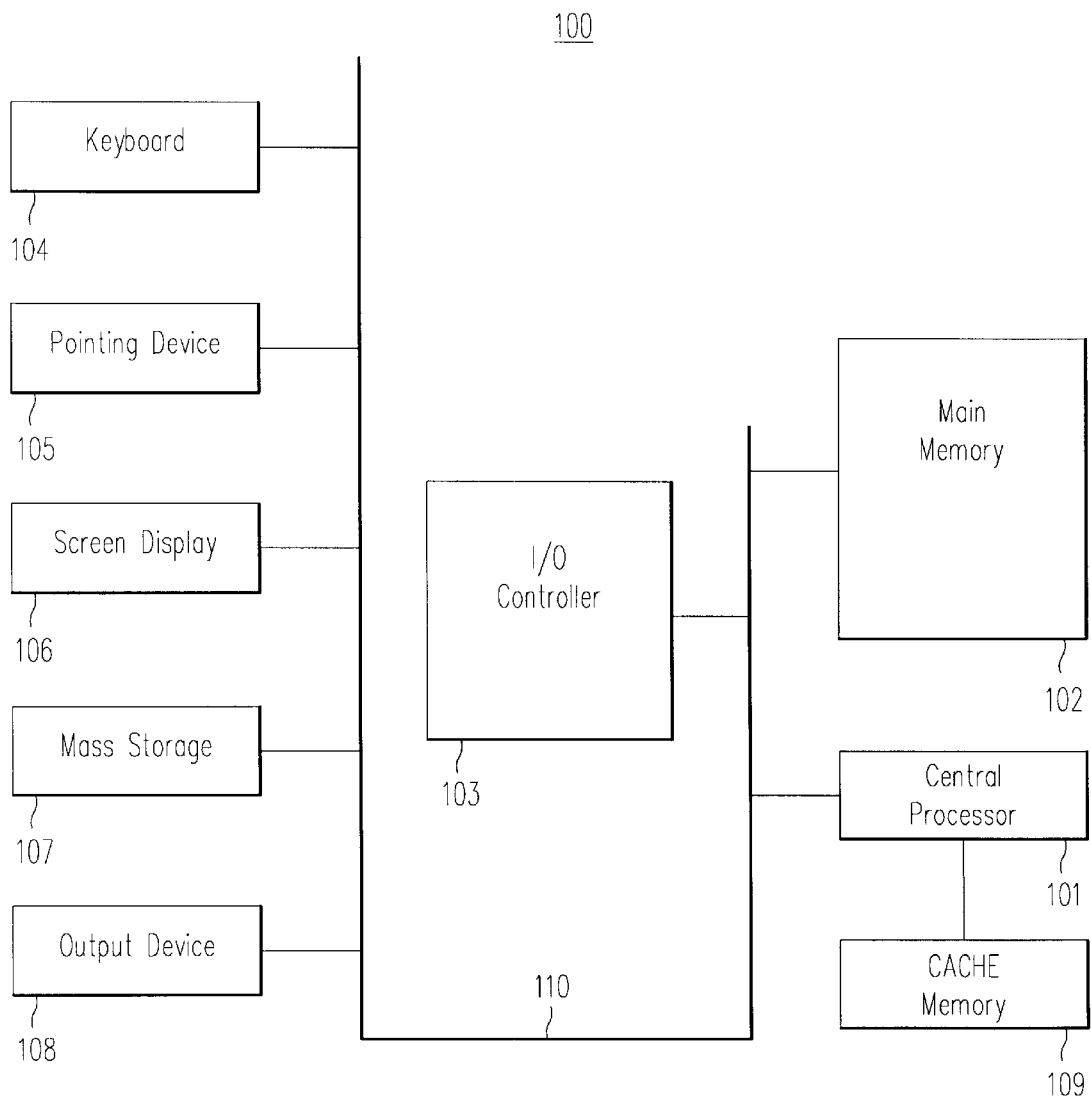
FIG. 1A is a block diagram illustrating a computer system in which the present invention may be embodied.

The invention may be embodied on a computer system such as the system 100 of FIG. 1A, which includes a central processor 101, a main memory 102, an input/output controller 103, a keyboard 104, a pointing device 105 (e.g., mouse, track ball, pen device, or the like), a screen display device 106, and a mass storage 107 (e.g., hard or fixed disk, removable disk, optical disk, magneto-optical disk, or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.) or a UNIX workstation such as a Sun Enterprise Server of Sun Microsystems of Mountain View, Calif.

Standalone System Software

Figure 1B:
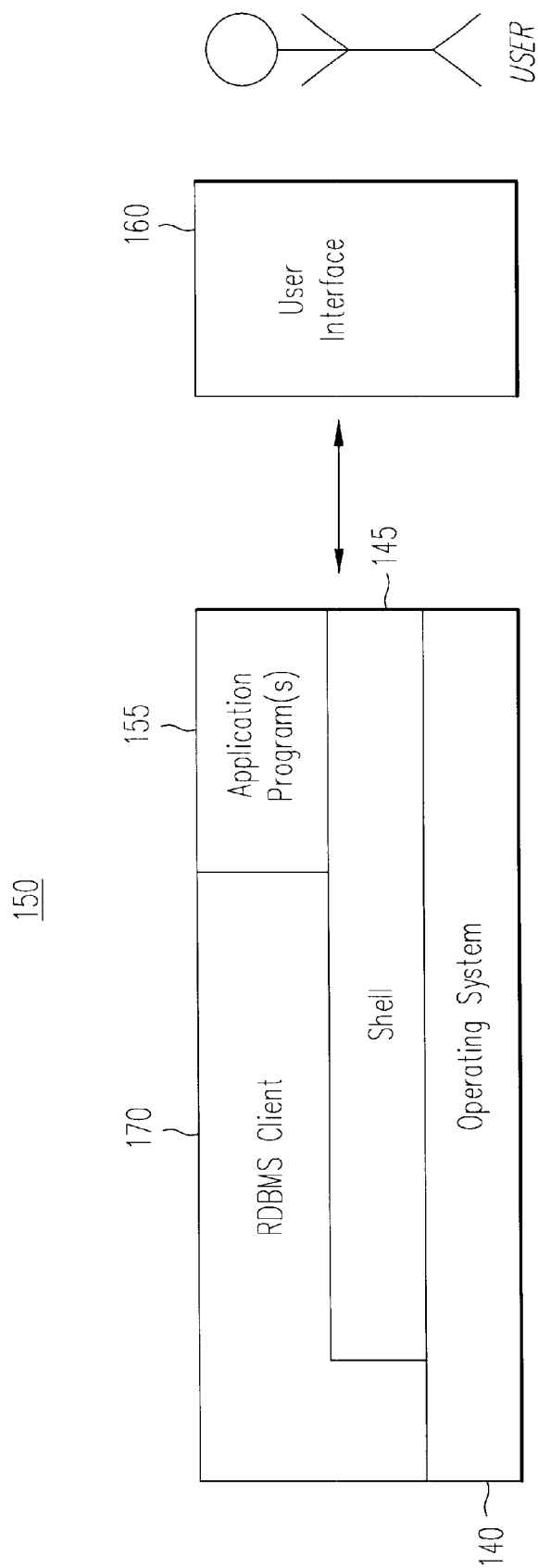
FIG. 1B is a block diagram illustrating a software subsystem for controlling the operation of the computer system of FIG. 1A.

Illustrated in FIG. 1B, a computer software system 150 is provided for directing the operation of the computer system 100. Software system 150, which is stored in system memory 102 and on mass storage or disk memory 107, includes a kernel or operating system (OS) 140 and a shell 145. One or more application programs, such as application software 155, may be "loaded" (i.e., transferred from storage 107 into memory 102) for execution by the system 100. The system also includes a user interface 160 for receiving user commands and data as input and displaying result data as output.

Also shown, the software system 150 includes a Relational Database Management System (RDBMS) front-end or "client" 170. The RDBMS client 170 may be any one of a number of database front-ends, including Red Brick RISQL Entry Tool, or the like. In an exemplary embodiment, the front-end will include SQL access drivers (e.g., Microsoft ODBC drivers, and the like) for accessing SQL database server tables in a Client/Server environment.

Client/Server Database Management System

Figure 2:
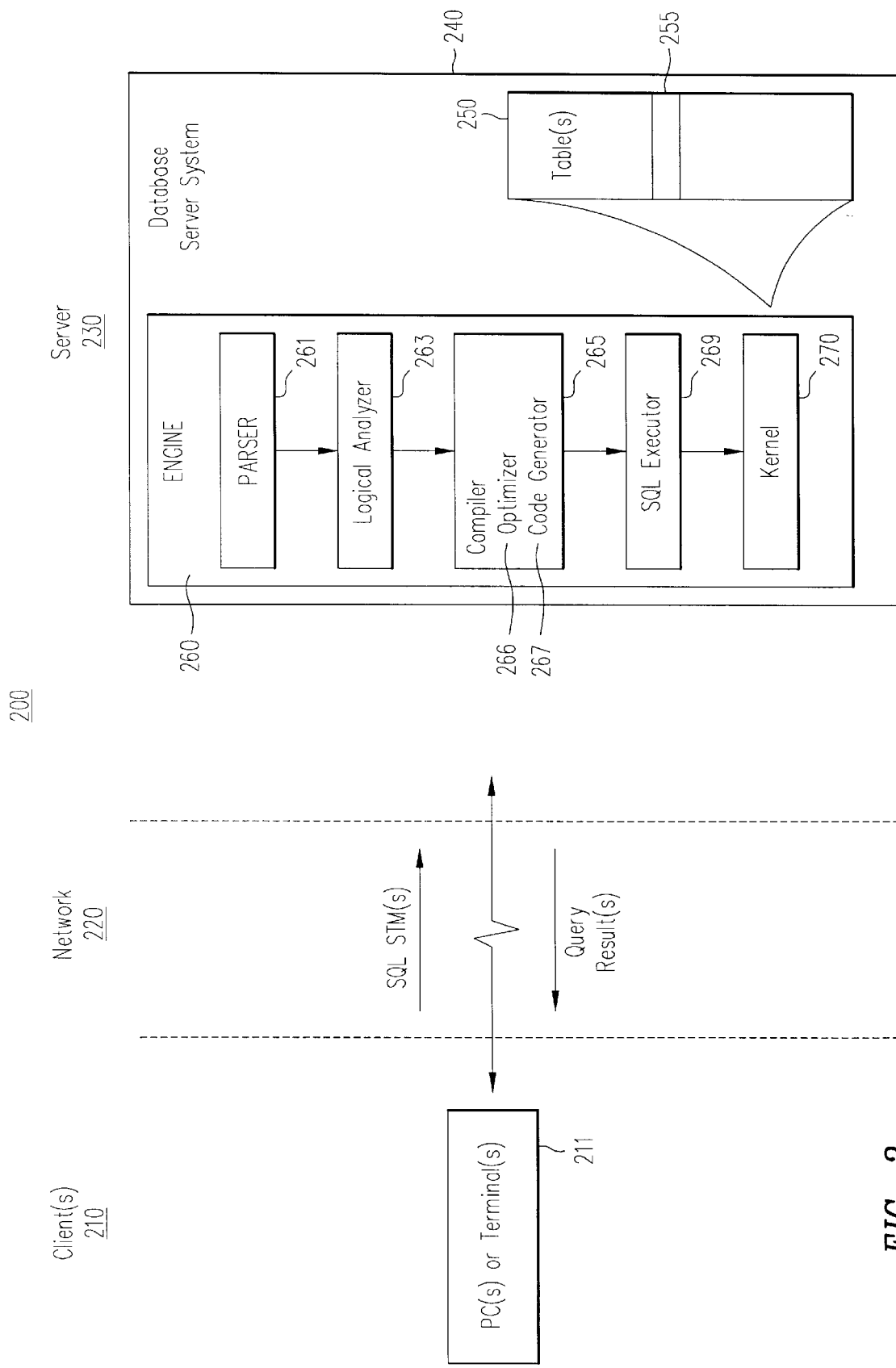
FIG. 2 is a block diagram of a client/server system in which the present invention may be preferably embodied.

While the present invention may operate within a single (standalone) computer (e.g., system 100 of FIG. 1A), the present invention is preferably embodied in a multi-user computer system, such as a Client/Server system. FIG. 2 illustrates the general structure of a Client/Server Database System 200 suitable for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows for PC clients.

The Database Server System 240, which comprises Red Brick™ Warehouse (available from Red Brick Systems, Inc. of Los Gatos, Calif.) in an exemplary embodiment, generally operates as an independent process (i.e., independently of the clients), running under a server operating system such as Microsoft Windows NT (Microsoft Corp. of Redmond, Wash.) or UNIX (The Open Group). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client calls in the well-known SQL (Structured Query Language) together with any parameter information into a format (of one or more packets) suitable for transmission across a cable or wire, for delivery to the Database Server 240.

Client/server environments, database servers, and networks are well documented in the technical, trade, and patent literature. In operation, the Client(s) 210 store data in or retrieve data from one or more database tables 250, shown in FIG. 2. Typically resident on the Server 230, each table itself comprises one or more horizontal rows or "records" (tuples) together with vertical columns or "fields." A database record includes information that is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the Clients issue one or more SQL commands to the Server. SQL commands may specify, for instance, a query for retrieving particular data (i.e., data records meeting the query condition) from the table 250. The syntax of SQL (Structured Query Language) is well documented; see, e.g., Date, C., *An Introduction to Database Systems,* Volumes I and II, Addison Wesley, 1990 (incorporated herein by reference for all purposes. In addition to retrieving the data from Database Server tables, the Clients also include the ability to insert new rows of data records into the table; Clients can also modify and/or delete existing records in the table.

For enhancing the speed in which the Database Server stores, retrieves, and presents particular data records, the Server maintains one or more database indexes on the table. A database index, typically maintained as a target index or as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file.

In operation, the SQL statements received from the one or more Clients 210 (via network 220) are processed by Engine 260 of the Database Server System 240. The Engine 260 itself comprises a Parser 261, Logical analyzer 263, Compiler 265, SQL Executor 269, and Kernel 270. Specifically, the SQL statements are passed to the Parser 261 which converts the statements into a query tree—a binary tree data structure which represents the components of the query in a format selected for the convenience of the system. In this regard, the Parser 261 employs conventional parsing methodology (e.g., recursive descent parsing).

The query tree is analyzed and rewritten by the Logical analyzer 263. Normalization includes, for example, the elimination of redundant data. Additionally, the Logical analyzer performs error checking, such as confirming that table names and column names which appear in the query are valid (e.g., are available and belong together). Finally, the Logical analyzer can also look up any referential integrity constraints which exist and add those to the query.

After analysis, the query tree is passed to the Compiler 265, which includes an Optimizer 266 and a Code Generator 267. The Optimizer is responsible for optimizing the query tree. The Optimizer performs a cost-based analysis for formulating a query execution plan. The Optimizer will, for instance, select the join order of tables (e.g., when working with more than one table); it will select relevant indexes (e.g., when indexes are available). The Optimizer, therefore, performs an analysis of the query and picks the best execution plan, which in turn results in particular ones of the Kernel being invoked during query execution.

The Code Generator, on the other hand, converts the query tree into a set of instructions suitable for satisfying the query. These instructions are passed to the SQL Executor 269. Operating under the control of these instructions, the SQL Executor 269 generates calls into lower-level routines, such as the Kernel 270, for retrieving relevant information (e.g., row 255) from the database table 250. After the plan has been executed by the SQL Executor, the Server returns a query result or answer table back to the Client(s).

Because the information (tables, indexes, and certain other data structures) and program instructions may be employed to implement the systems/methods described herein, the present invention relates to machine readable media that include program instructions, tables, indexes, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Hybrid Target Index Representation

Figure 3:
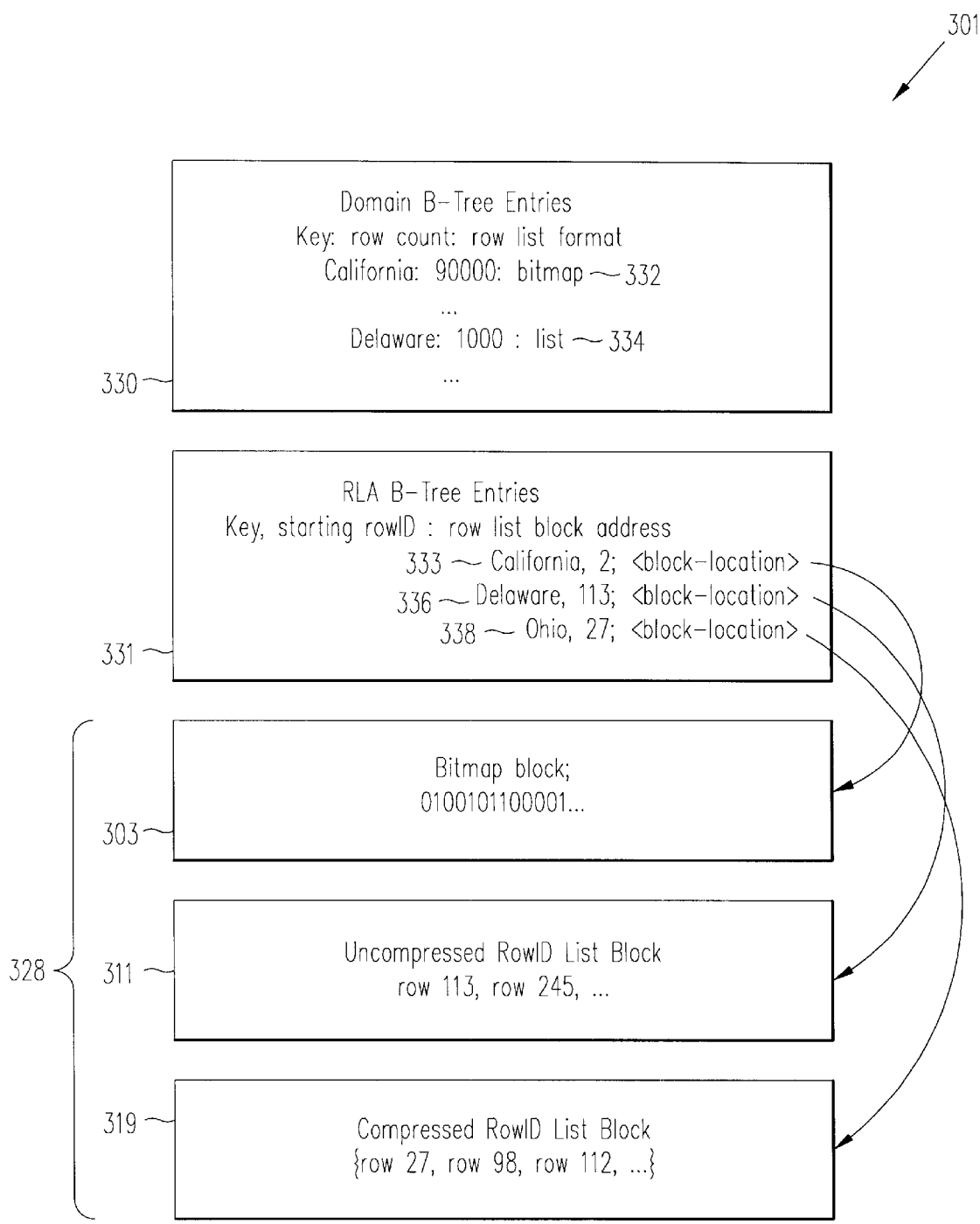
FIG. 3 is a schematic illustration of a hybrid index in accordance with one embodiment of this invention.

FIG. 3 presents a simplified representation of a hybrid target index 301 in an idealized block representation. In the figure, index 301 could be created for a customer state column in an enterprise's database of all its customers. The enterprise has customers in many states, and the "domain" of index 301 is the list of all states in which the enterprise has customers. To simplify this discussion, the illustration shows only index entries for California, Delaware, and Ohio customers.

In this example, the index has three main components: a Domain B-Tree 330, a record location area (RLA) 331, and a record list section 328. Preferably RLA 331 is implemented as a B-Tree. For California, index 301 contains a Domain B-Tree entry 332, one or more row-ID list blocks 303, and one RLA B-Tree entry 333 for each row-ID list block. The number of row-ID list blocks required depends on the size of the row-ID list. In this example, the block of row-IDs is represented as a bitmap. This determination may have made because the California key is weakly selective. In other words, a query on the customer table specifying only records for California customers, will return a relatively large number of records—likely because the enterprise has a high proportion of California customers (in comparison to customers in other states).

Note that the California entry 332 of Domain B-Tree 330 includes a key indicating California and a two-part value indicating the number of rows with California as the state, in this case 90,000 and the representation of the row-ID list for California, in this case a bitmap.

For Delaware, a Domain B-Tree entry 334 indicates that there are 1000 records with Delaware as a state and that a row-ID list 311 for Delaware is represented as an uncompressed list. RLA 331 contains an entry 336 for Delaware which contains a pointer to list 311. More specifically, it points to a block beginning with row-ID 113.

In contrast to index entry 303 for the California key, Delaware entry 311 represents value portion 315 in a list representation format. That is, the value portion lists only the records having the Delaware key as discrete numbers, without representing records that do not have Delaware as the key. Note that the bitmap representation does represent records that do not possess the key for the index entry (typically as 0s). In this example, the Delaware list representation is uncompressed to facilitate rapid identification of Delaware key records during queries constrained on Delaware customers. The uncompressed list representation for Delaware customers may have been chosen because Delaware customers make a relatively small percentage of the enterprise's total customers. Thus, a query constrained to Delaware customers could be characterized as strongly selective.

For Ohio, an index entry 319 includes compressed blocks of row-IDs: one beginning at row 27, another beginning at row 98, another beginning at row 112, etc. Unlike the index entries for California and Delaware customers, Ohio entry 319 presents its row list portion 323 as a list of compressed record IDs (e.g., row-IDs for a relational database table). This representation may have been chosen because Ohio customers comprise an intermediate percentage of the enterprise's total customer base.

Ohio also contains RLA entries pointing to the compressed row-ID blocks in list 319. For example, RLA 331 includes an entry 338 pointing a compressed block of row-IDs beginning with row-ID 27. Other RLA entries for Ohio are not depicted. Domain B-Tree 330 will also have an entry for Ohio (not shown). That entry will specify the total number of rows having Ohio as the state and that the Ohio entries are represented as a compressed row list.

The entries for other keys of hybrid index 301 are not illustrated in this figure. In a specific example, there are 50 entries, one for every state in the United States, in hybrid index 301.

Process of Creating a Hybrid Target Index

Figure 4:
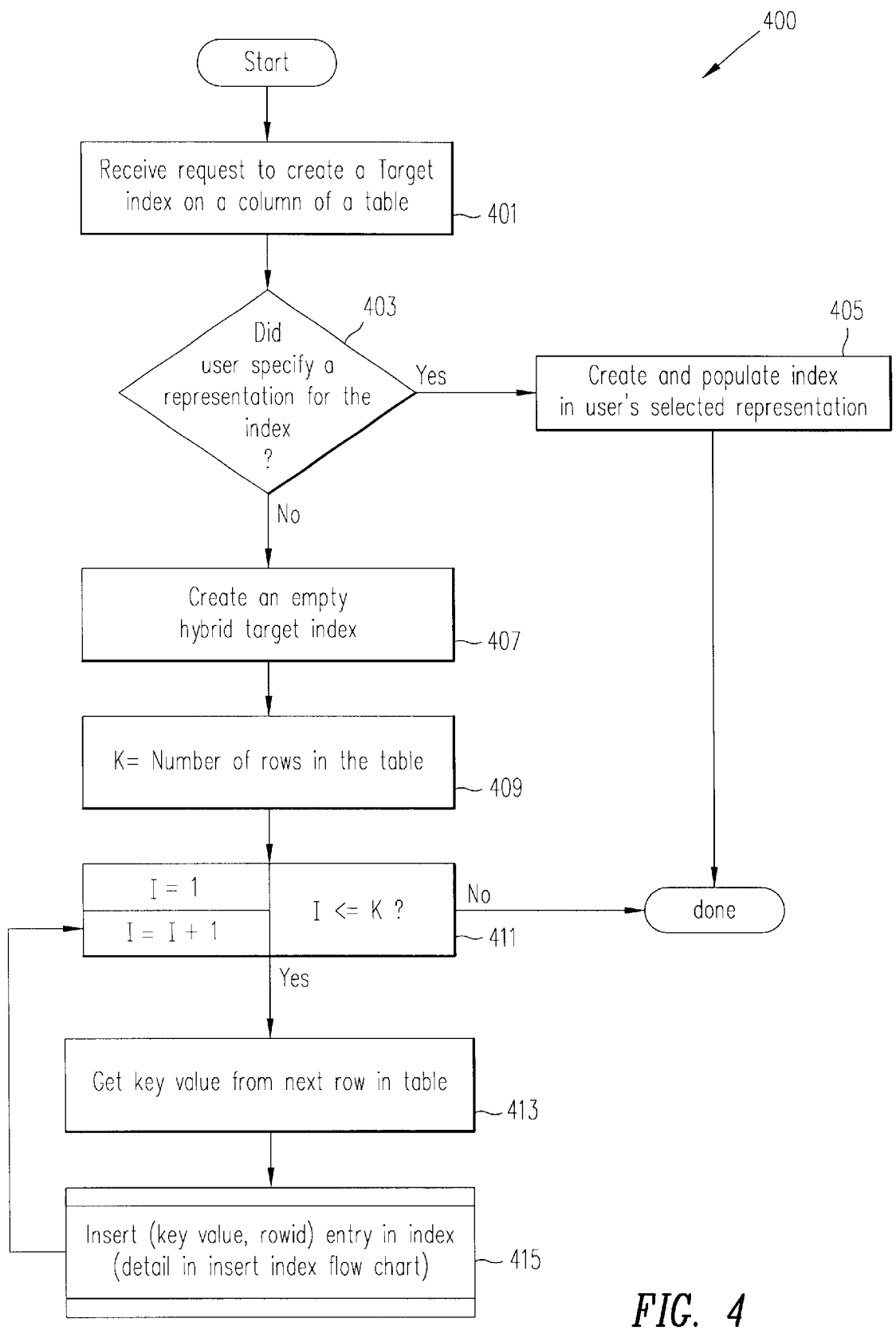
FIG. 4 is a process flow chart of a technique for creating a hybrid index in accordance with one embodiment of the invention.

FIG. 4 is a process flow diagram illustrating how a relational database management system may create a new index in accordance with this invention. In the figure, a process 400 begins with receipt of a request to create a target index on a column (401). A user may be given the option to create either a B-tree index or a target index. Usually when the domain size is above a predefined threshold (e.g., above about 10 percent of the records in a data set), a B-tree index should be created. For columns having a smaller domain size, a target index may be more appropriate. This process flow assumes that a target index is being created.

The user's request to create a target index may have the following format, for example:
create target index on customer_state on customer_tbl (state) domain size medium;

After receiving the request to create a target index, the system determines whether the user selected a representation based upon domain size (403). In the above example, the user selected a domain size of "medium." In a preferred implementation, the user's domain size parameter translates to the following representations: "domain size small" indicates that the value will be represented as a bitmap list; "domain size medium" indicates that the value will be represented as a compressed list; and "domain size large" indicates that the value will be stored as an uncompressed list.

Assuming that the user did in fact select a representation based upon domain size in the request to create a target index, the system will go ahead and create an index in the selected representation (405). The process is then completed. Assuming on the other hand, that the user did not select a specific representation based upon domain size, the system will define a hybrid target index (407). Preferably, this involves creating an empty index and allocating space for and initializing empty Domain and RLA B-Trees.

After the hybrid target index has been defined, the system must now process each of the rows in the table on which the index is created. This operation is represented in process 400 as a loop over the number of rows in the column. First, the system determines the number of rows in the column (409). In process 400, this is represented as a setting a variable "K" equal to the number of rows. The system then steps through each of the rows under the control of an iterative loop step 411. Initially an index "i" associated with a row is set to one. The system then determines whether the current value of the index i is greater than K. On the first pass, that will not be the case. Note that while the processing is represented as a loop in process 400, it is preferably implemented as a "relation scan" operation on the table.

After the system has determined that the current value of i is less than or equal to the value of K, it gets the key from row(i) in the table (413). Then the system inserts a <key:row-ID> entry in the hybrid target index (415). This step is detailed in FIG. 5 and explained below.

Next, process control returns to iterative loop step 411 where the counter i is incremented by one. Again the system checks to determine whether i is greater than K. Assuming that it is not, the system returns to get the key for new row(i) and then create and insert the index entry (key: row-ID) as appropriate at 413 and 415 as described above. After handling all rows in under consideration (e.g., all rows in the table on which the index is being created), the process is essentially complete. At that point, iterative loop step 411 will determine that the value of i is in fact greater than K. The process is then concluded as indicated.

Figure 5:
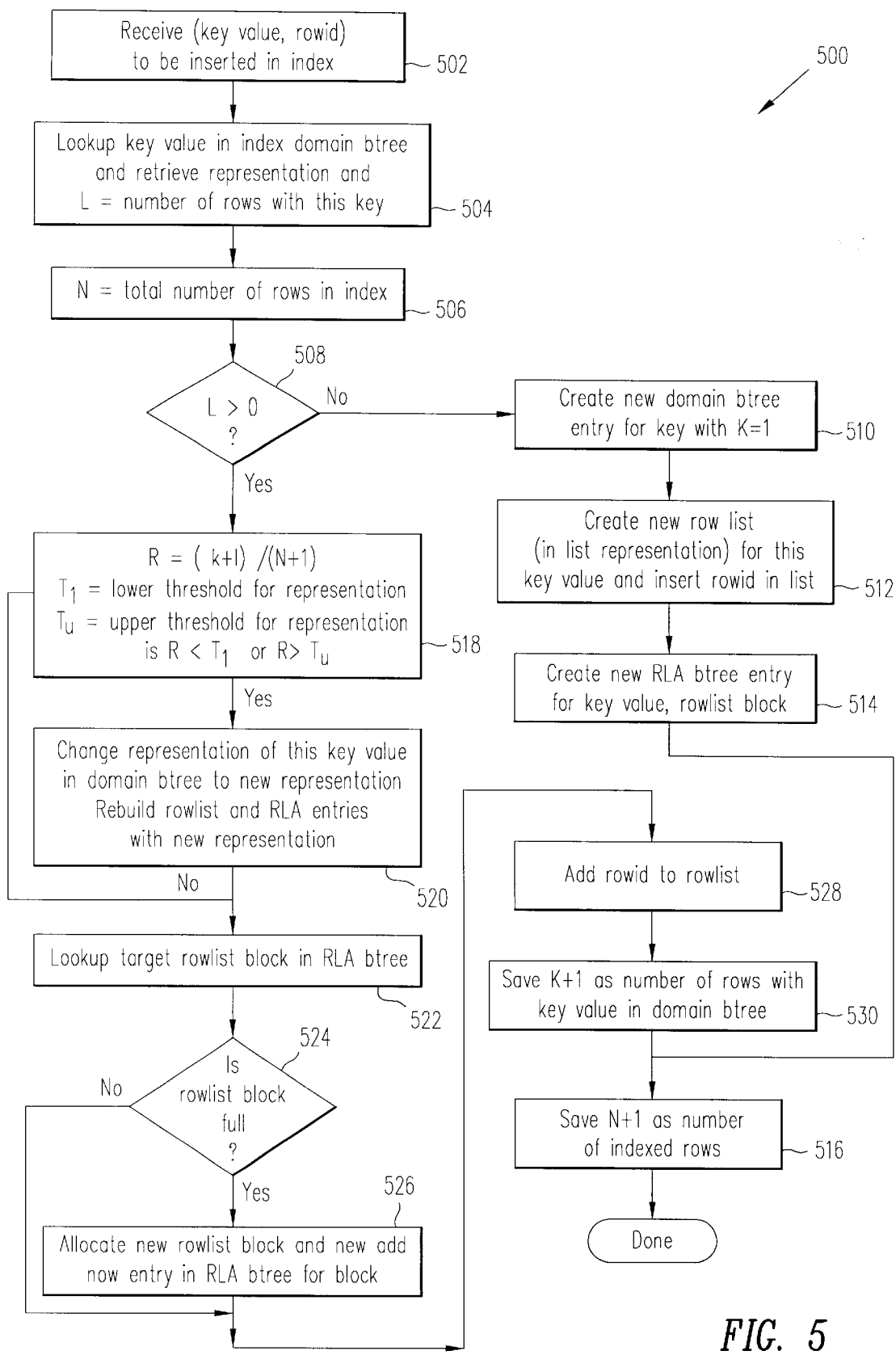
FIG. 5 is a process flow chart detailing a technique for inserting an entry in a hybrid index in accordance with one embodiment of the invention.

The process of inserting an entry into a hybrid target index is detailed as a process 500 in FIG. 5. This process corresponds to step 415 in FIG. 4. Process 500 begins at 502 with the DBMS receiving the key value and row-ID to be inserted in the index. It then looks up the key in an index domain B-tree and retrieves from there both the representation of the key's value in the target index (e.g., bitmap representation versus list representation) and the number of rows having this key (504). For this discussion, the number of rows is represented as "L." For the keys having no records as yet, the index domain B-Tree will contain no entry. Note that the system will store the total number of rows in the index at this point. In this flow chart, the current number of rows is represented by "N" (506).

Next, at 508, the system determines whether the value of L is greater than 0 (i.e., are there any records currently indexed for the key of the row under consideration). Stated another way, the system determines whether the current key is a new key for the index. If so, the system takes the necessary steps to identify the key for future instances. It does this by first creating a new domain B-Tree entry for the key, with L equal to 1 (510). It then creates a new row list (in list representation) for the key and inserts the entry into the hybrid index (512). Finally, the DBMS creates a new RLA B-Tree entry for the key and rowlist block (514). Process 500 is then completed by saving N+1 as the number of indexed rows (516), so that proper decisions can be made for the next row to be considered.

Assuming that the L is greater than 0 (i.e., step 508 is answered in the negative), the DBMS then calculates the appropriate representation for that key based upon that key's selectivity (518). The appropriate representation may be determined by the fraction of records having the key under consideration. In the above example, such calculation might indicate that the row list of Californian customers in a customer table should be represented as a bitmap. The same calculation might indicate that the Delaware customers' row list should be provided in uncompressed list representation. Still further, that calculation might indicate that the row list associated with the Ohio customers should be in compressed list representation.

In a specific implementation, step 518 is performed by calculating a selectivity $R=(L+1)/(N+1)$. The system also stores appropriate "thresholds" for each of the multiple representations in the hybrid target index. For example a compressed list representation may have a lower threshold $T_1$ and an upper threshold $T_u$. So long as the value of R remains between these values, the compressed list representation is deemed proper. However, if R falls outside of range, then a representation change may be required. As indicated in FIG. 5, the system determines whether R falls between the thresholds for the current representation of the key under consideration (518). This essentially determines whether the system should switch representation of the current key. For example, if the new index entry includes the state of Ohio as a key, and the newly calculated percentage of the rows having the key Ohio passes a threshold, the optimal representation may switch from a compressed list representation to a bitmap representation. In such case, the system will have to build a new index entry having the new representation (a bitmap in this example).

Returning to process 500, assuming that the system determines that R falls outside the range for the key's current representation (518 is answered in the affirmative), the system changes representation of the key (520). This may involve changing to a new representation for the current key in the domain B-Tree. It may also involve rebuilding the rowlist and RLA entries with the new representation. If the current value of R does not indicate that a representation change is required, the system skips 520 (the representation change).

In a specific embodiment, the bitmap representation has a lower threshold of 1/256 and an upper threshold of 1. In this embodiment, the compressed list representation has a lower threshold of 1/16384 and an upper threshold of 1/64. Finally, the uncompressed list representation has a lower threshold of 0 and an upper threshold of 1/4096. Note that the ranges for each representation overlap. This is due to threshold offset, a concept discussed below.

After R has been calculated and any necessary change in representation made, the system looks up the entry for the key in the RLA B-Tree (522). It then determines whether the rowlist block is full (524) by checking the block itself. Assuming that the RLA indicates that the rowlist block for the key is full, the system will allocate a new rowlist block and a new entry in the RLA B-Tree for the block (526). This makes room for the new row-ID. If the rowlist block is not found to be full, the system skips 526. Note that the invention may check available storage space and allocate necessary space by a variety of mechanisms—not just via presized rowlist blocks.

In a specific embodiment, a bitmap block size is 8 Kilobytes, a compressed list block size is 1 Kilobyte, and an uncompressed list block size varies between 16 bytes and 8 Kilobytes.

Next, the system adds the new row-ID to the rowlist for the current key (528). The system then stores the new current number of rows (L+1) associated with the current key (530). Finally, the system stores the new current number of total rows (N+1) at 516 as described above.

The above description for creating a new hybrid index may apply to record sets of any size. In a preferred embodiment, however, hybrid indexes are not created for relatively small record sets. Any actual implementation of an index specifies representations for items like row-IDs and counts of the numbers of records. These specifications do impose limits on the size of the record set for which hybrid indexes may be created. In one specific embodiment, hybrid indexes are created only for record sets having at least $2^{32}$ records. More preferably, hybrid indexes are created only for record sets having at least $2^{46}$ records.

Process of Revising a Hybrid Target Index

Figure 6:
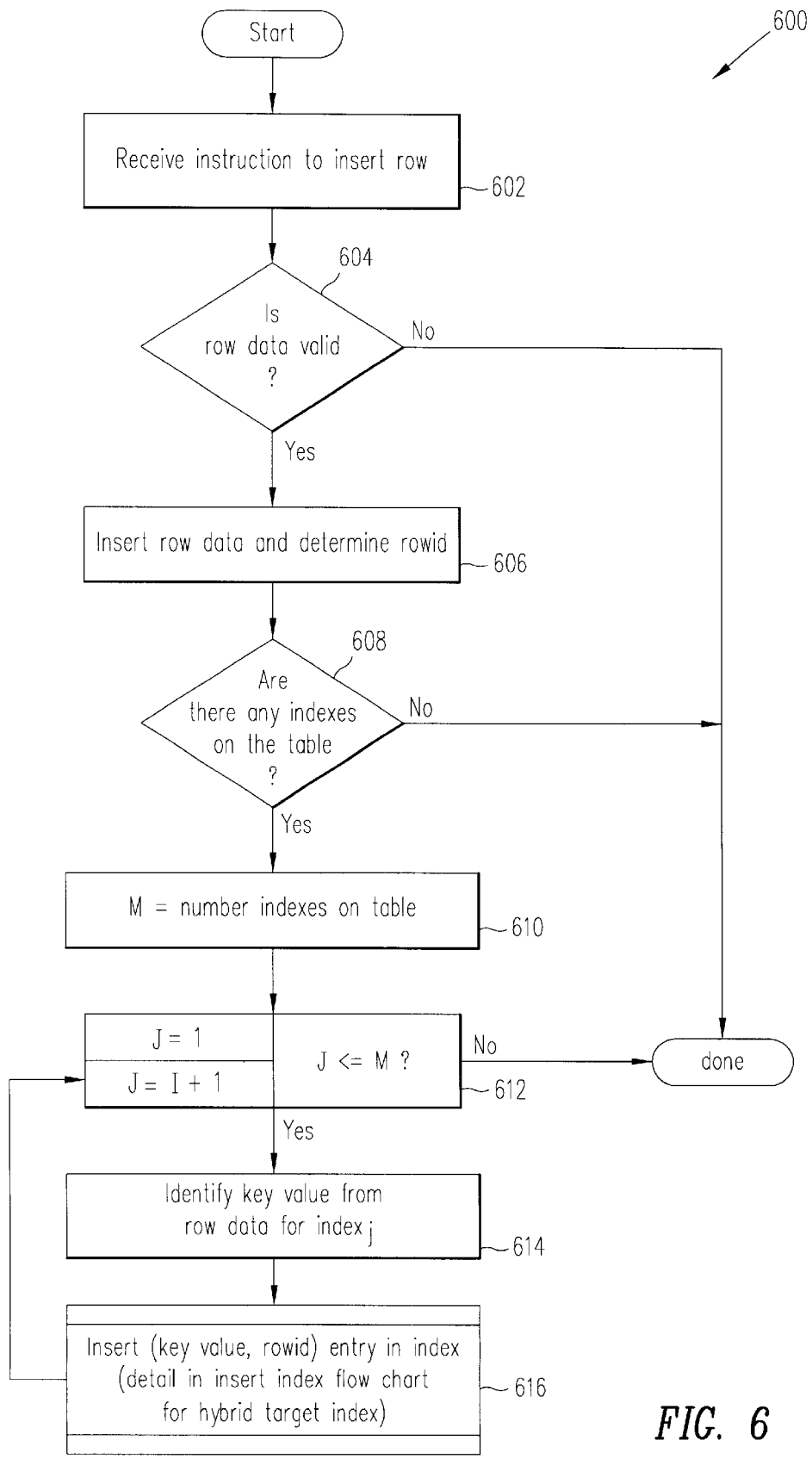
FIG. 6 is a process flow chart of a technique for handing a row INSERT command in accordance with one embodiment of the invention.

FIG. 6 presents a process flow 600 which may be employed to revise a hybrid target index in response to insertion of a new row in a table having a column or columns on which the hybrid index is built. Process 600 begins at 602 with the DBMS receiving instructions to insert a row.

The process of inserting a row may actually be part of a more expansive process such as inserting group of rows. Or it may be part of an update command in which one or more rows are first deleted and then one or more new rows are inserted in their place(s). Regardless of the scope of the insert or update process, at one level it involves inserting a single row. Thus, the row insert process 600 of FIG. 6 may be part of a larger process involving multiple rows and/or a delete operation.

The system then determines whether the row contains valid data (604). Database management systems typically have specified criteria for making this determination. If the row does not contain valid data, the process is concluded as indicated. Assuming that the system has determined that the row data is valid, it next inserts the row at 606 per normal DBMS processing.

Thereafter, the system determines whether any columns in the table into which the row is to be inserted have indexes (608). If not, the process is then completed. If, however, the row to be inserted does include a column or columns on which an index exists, the system determines how many of the columns have indexes (610); here M represents the number of indexes. This is necessary to handle each of the indexes associated with the new row. Here, the treatment of each index is illustrated as a single iteration in a loop. The operations are controlled under an iterative loop step 612 which increments an index "j" until it exceeds the value of M.

For each index (value of j), the system identifies the key from the row data to be inserted (614). It then inserts the row-ID into the index in the proper representation (616). Preferably, this procedure is implemented as depicted in FIG. 5 (process 500). Process control then returns to iterative loop step 612 where the counter j is incremented by one.

In a preferred embodiment, the DBMS handles row deletions in tables having hybrid target indexes in the same manner that it treats deletions in tables having standard target indexes. In other words, the record list representation for a hybrid index key is not changed. Of course, the system must keep track of the total number of rows so that the selectivity of keys in the hybrid index may be calculated during subsequent inserts.

In an alternative embodiment, the deletion process is much the same as the insert process except that it involves deleting an entry from a hybrid index rather than adding an entry. Also, if the row being deleted contains the last instance of a key, then the keys must be removed from the hybrid target index.

An update command is typically executed as a delete command followed by an insert command. Thus, the interesting portion of the process flow for an update command may follow that of a row insert (FIGS. 6 and 5).

Figure 7:
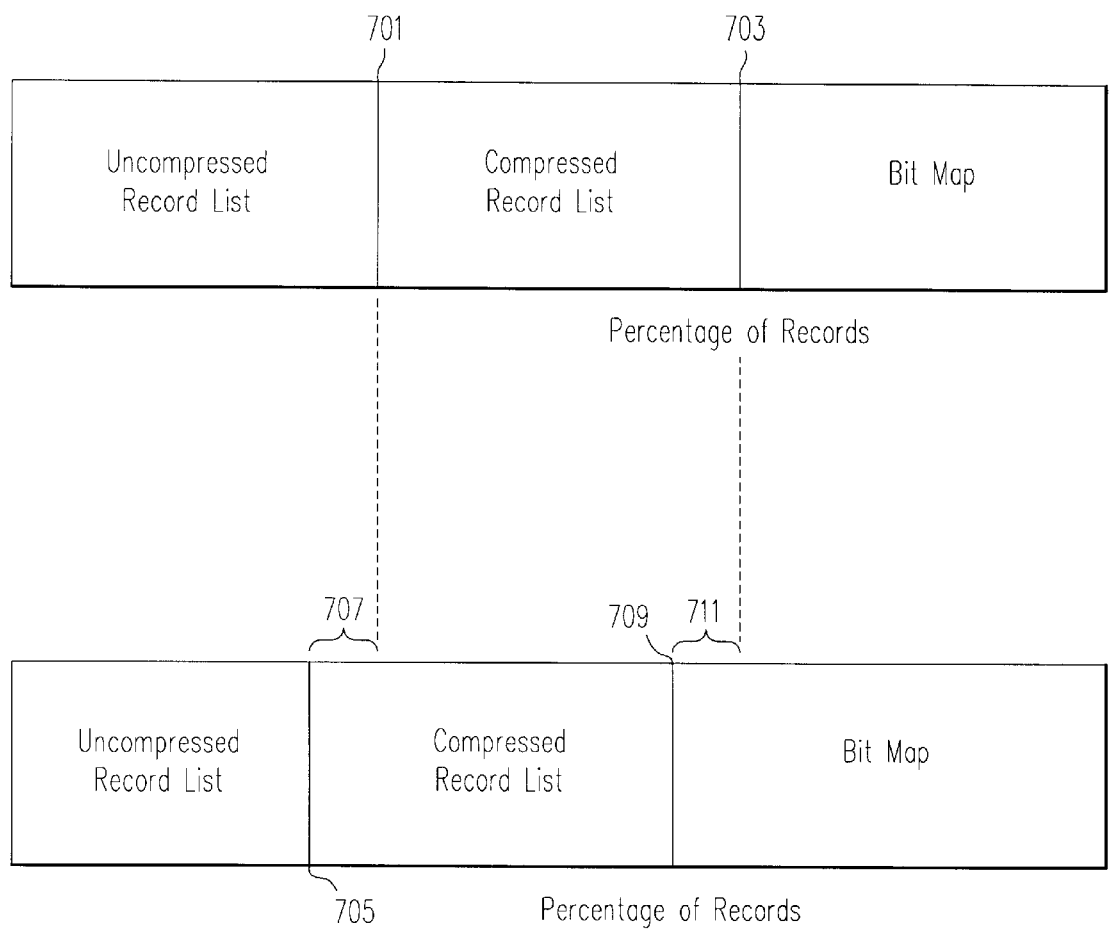
FIG. 7 is a graphical illustration of thresholds for changing representation of record set values in a hybrid index, which thresholds are offset between increasing key selectivity and decreasing key selectivity.

As noted in the discussion of process 500, the system must at some point determine whether to switch a current representation of a record list value associated with a particular key. This typically involves determining whether the percentage of records in a data set having the key falls above or below a predefined threshold. FIG. 7 illustrates this concept. As shown, in the upper portion of the plot shown in FIG. 7 a particular key may be characterized according to the percentage of the records in a data set that have the key (the selectivity). At a very low percentage, the value associated with that key is represented as an uncompressed row-ID list. At some percentage indicated by reference 701, the value associated with the key is optimally represented as a compressed row-ID list. In fact, for all percentages between threshold 701 and the second threshold 703, the value is optimally represented as a compressed row-ID list. At percentages higher than 703, however, the optimal representation is a bitmap.

In a preferred embodiment, the thresholds for transitioning to a different representation are offset for the case where the percentage increases (selectivity increasing) and the case where the percentage is decreasing (selectivity decreasing). As shown in the bottom portion of the plot in FIG. 7, when the percentage is decreasing, the threshold between the uncompressed and compressed row-ID list is given by reference number 705. Note that the value of 705 is lower than the value of 701 by an offset 707. Similarly, the transition from bitmap to compressed row-ID list is given by a threshold value 709 that is separated from threshold 703 by an offset 711.

Note that an increasing percentage of records in a data set associated with a particular key may come about by adding one or more new records that have the key or deleting one or more records that do not have the key. In contrast, decreasing the percentage may occur by removing one or more records that have the key or adding one or more records that do not have the key.

One reason for having the offset represented in Figure is to stabilize the system so that during transition periods the database management system is not forced to frequently oscillate between one representation and another. After a threshold is crossed, the new representation will not be torn down until the percentage of records changes by at least the offset amount.

Although the foregoing invention has been described in some detail for purposes of clarity of understanding, it will be apparent that certain changes and modifications may be practiced within the scope of the appended claims. For example, while the specification presents a single mechanism for bitmap representation (each key is given its own bitmap), other bitmap representations may be employed. For example, a single bitmap may be employed to represent multiple keys; in this case, more than one bit could be used to represent each record. Further, while specification focuses on "target indexes," the invention applies more broadly to any index format having entries in which a value portion may have multiple representations.

What is claimed is:

1. A computer program product, stored on machine-readable medium, for maintaining a data set, comprising instructions operable to cause a programmable processor to:
provide a hybrid index on a domain, the hybrid index including entries, each of which includes a value associated with a key, the value portion of each entry specifying a record or records in a data set that has the key for the entry, wherein the hybrid index uses two or more representations for the value portions of the entries, and wherein the representation of a value associated with a key depends on the selectivity of the key.

2. The computer program product of claim 1, wherein the data set is a collection of records in a database.

3. The computer program product of claim 1, wherein the data set is a relational database table.

4. The computer program product of claim 1, wherein the two or more representations include at least two of the following: bitmaps, uncompressed record lists, and compressed record lists.

5. The computer program product of claim 4, wherein the data set is a database table and the uncompressed record lists are uncompressed lists of row-IDs in the database table and the compressed record lists are compressed lists of rows in the database table.

6. The computer program product of claim 1, wherein a first key having a value represented as a record list, is more highly selective than a second key having a value represented as a bitmap.

7. The computer program product of claim 1, wherein values are represented in increasing order of key selectivity as follows: (a) bitmaps, (b) compressed record lists, and (c) uncompressed record lists.

8. The computer program product of claim 1, further comprising a record location area including multiple <key:index location> entries, each specifying the location in the hybrid index of an entry for a given key.

9. The computer program product of claim 8, wherein the entries in the record location area further specify the representation type for the values associated with the keys in the hybrid index.

10. In a computer system comprising a data set and a hybrid index of entries, each of which includes a value associated with a key, the value portion of each entry specifying a record or records in the data set, wherein a first entry has a first representation for its value and a second entry has a second representation for its value,
a method of modifying the hybrid index when a record in the data set is inserted, deleted, or updated, the method comprising:
(a) identifying the hybrid index key of the record that is being inserted, deleted, or updated;
(b) determining how to represent the value of the hybrid index entry for the key of the record that is being inserted, deleted, or updated; and
(c) representing, as determined in (b), the value of the hybrid index entry for the key of the record being inserted, deleted, or updated.

11. The method of claim 10, wherein determining how to represent the value at (b) involves determining whether the data set has less than a predefined number of records, and wherein when the data set has less than said predetermined number of records, specifying the representation based upon the data set being small.

12. A computer program product comprising a computer readable medium on which is stored program instructions for performing the method recited in claim 10.

13. The method of claim 10, wherein the data set is a relational database table.

14. The method of claim 10, wherein determining how to represent the value of the hybrid index entry comprises determining the selectivity of the key of the record being inserted, deleted, or updated.

15. The method of claim 14, wherein the value for the hybrid index entry for the key of the record that is being inserted, deleted, or updated is represented in one of the following formats: a bitmap, an uncompressed list of records, and a compressed list of records.

16. The method of claim 14 wherein determining how to represent the value of the hybrid index entry comprises determining whether the selectivity of the key of the record that is being inserted, deleted, or updated is above a predefined threshold, wherein when the key is found to be above the predefined threshold, the value of the hybrid index entry is represented as a bitmap.

17. The method of claim 14 wherein determining how to represent the value of the hybrid index entry comprises determining whether the selectivity of the key of the record that is being inserted, deleted, or updated is below a predefined threshold, wherein when it is found that the key is below the predefined threshold, the value of the hybrid index entry is represented as a list of row-IDs.

18. The method of claim 10, wherein representing, as determined in (b), the value of the hybrid index entry involves changing a previous representation of the value of the hybrid index entry to a new representation.

19. The method of claim 18, wherein changing a previous representation changes a bitmap representation to a list of row-IDs representation, or changes a list of row-IDs representation to a bitmap representation.

20. The method of claim 18, further comprising noting the new representation in a record locator area for the hybrid index.

21. The method of claim 18, wherein determining how to represent the value at (b) finds that a selectivity threshold for the key of the record that is being inserted, deleted, or updated has been passed as a result of the insertion, deletion, or update.

22. The method of claim 21, wherein the method employs two distinct thresholds for changing a first representation to second representation, a first threshold associated with increasing the selectivity of the key and a second threshold associated with decreasing the selectivity of the key, wherein the first threshold is greater than the second threshold.

23. In a computer system comprising a relational database table and configured to store a hybrid index of entries, each of which includes a value associated with a key, the value portion of an entry specifying a record or records in the data set, wherein a first entry has a first representation for its value and a second entry has a second representation for its value, a method of creating the hybrid index comprising:

(a) identifying the key of one or more records in the relational database table;

(b) determining how to represent the value of the hybrid index entry for the key of the record or records, depending on a selectivity of the key; and (c) representing, as determined in (b), the value of the hybrid index entry for the key of the record or records.

24. The method of claim 23, wherein the value of hybrid index entry for the key is represented in one of the following formats: a bitmap, an uncompressed list of records, and a compressed list of records.

25. The method of claim 23 wherein determining how to represent the value of the hybrid index entry comprises determining whether the selectivity of the key is above a predefined threshold, wherein when the key is found to be above the predefined threshold, the value of the hybrid index entry is represented as a bitmap.

26. The method of claim 23 wherein determining how to represent the value of the hybrid index entry comprises determining whether the selectivity of the key is below a predefined threshold, wherein when it is found that the key is below the predefined threshold, the value of the hybrid index entry is represented as a list of row-IDs.

27. The method of claim 23, wherein determining how to represent the value involves determining whether the data set has less than a predefined number of records, and wherein when the data set has less than said predetermined number of records, specifying the representation based upon the data set being small.

28. A computer program product comprising a computer readable medium on which is stored program instructions for performing the method recited in claim 23.

29. A method for creating a hybrid index, the method comprising:

identifying one or more keys in a data set to be indexed;

for each key, selecting a representation to represent which records in the data set includes the key, the selection depending on the selectivity of the key; and for each key, representing which records in the data set includes the key each in accordance with the selection.

30. The method of claim 29, wherein the representation includes either a bitmap, a compressed records list, or an uncompressed records list.

31. A method for modifying a hybrid index in a data set, the method comprising:

calculating parameters of one or more keys in the hybrid index in response to an insertion, deletion, or update of the data set;

for each key whose corresponding parameters has changed in response to the insertion, deletion, or update of the data set, selecting a representation to represent which records in the data set includes the key, the selection depending on the changed parameters of the key; and representing which records in the data set includes the key each in accordance with the selection.

32. The method of claim 31, wherein calculating parameters includes calculating selectivity.

33. The method of claim 31, wherein calculating parameters includes calculating cardinality.

* * * * *

UNITED STATES PATENT AND TRADEMARK OFFICE
CERTIFICATE OF CORRECTION

PATENT NO. : 6,360,213 B1
DATED : March 19, 2002
INVENTOR(S) : William M. Wagstaff et al.

It is certified that error appears in the above-identified patent and that said Letters Patent is hereby corrected as shown below:

Drawings,
Figure 5, block 510, please delete "K=1" and insert -- L=1 --.
Figure 5, block 518, please delete "K+1" and insert -- L+1 --.
Figure 5, block 530, please delete "K+1" and insert -- L+1 --.

Column 4,
Lines 60-61, please delete "FIG. 3 is a schematic illustration of a hybrid index in accordance with one embodiment of this invention."

Column 6,
Line 60, please insert -- , -- after "1990".

Column 13,
Line 14, please insert -- 7 -- after "Figure".

Column 14,
Line 2, please delete "-" after "key".

Signed and Sealed this

Twenty-seventh Day of July, 2004

JON W. DUDAS
*Acting Director of the United States Patent and Trademark Office*